US008131917B2

(12) United States Patent
Cornwell et al.

(10) Patent No.: US 8,131,917 B2
(45) Date of Patent: Mar. 6, 2012

(54) STORING A DRIVER FOR CONTROLLING A MEMORY

(75) Inventors: Michael J. Cornwell, San Jose, CA (US); Christopher P. Dudte, San Jose, CA (US); Carl Norum, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/207,192

(22) Filed: Aug. 10, 2011

(65) Prior Publication Data

US 2011/0296092 A1 Dec. 1, 2011

Related U.S. Application Data

(63) Continuation of application No. 11/531,197, filed on Sep. 12, 2006, now Pat. No. 8,001,314.

(51) Int. Cl.
G06F 13/16 (2006.01)
(52) U.S. Cl. ........ 711/103; 711/105; 711/154; 711/165; 713/1; 719/327
(58) Field of Classification Search .................. 711/103, 711/105, 154, 165; 713/1; 719/327
See application file for complete search history.

(56) References Cited

U.S. PATENT DOCUMENTS

| 5,602,987 | A | 2/1997 | Harari et al. |
|---|---|---|---|
| 5,671,229 | A | 9/1997 | Harari et al. |
| 5,719,808 | A | 2/1998 | Harari et al. |
| 6,081,850 | A | 6/2000 | Garney |
| 6,149,316 | A | 11/2000 | Harari et al. |
| 6,173,374 | B1 | 1/2001 | Heil et al. |
| 6,330,806 | B1 | 12/2001 | Beaverson et al. |
| 6,426,893 | B1 | 7/2002 | Conley et al. |
| 6,721,820 | B2 | 4/2004 | Zilberman et al. |
| 6,757,842 | B2 | 6/2004 | Harari et al. |
| 6,763,424 | B2 | 7/2004 | Conley |
| 6,914,846 | B2 | 7/2005 | Harari et al. |
| 6,947,332 | B2 | 9/2005 | Wallace et al. |
| 7,137,011 | B1 | 11/2006 | Harari et al. |
| 7,162,569 | B2 | 1/2007 | Conley et al. |
| 7,237,046 | B2 | 6/2007 | Paley et al. |
| 7,237,074 | B2 | 6/2007 | Guterman et al. |
| 7,240,219 | B2 | 7/2007 | Teicher et al. |
| 7,426,143 | B2 | 9/2008 | Kim et al. |
| 7,793,279 | B1 * | 9/2010 | Le et al. .................. 717/168 |
| 8,028,155 | B1 * | 9/2011 | Righi et al. ................ 713/2 |
| 2002/0049888 | A1 | 4/2002 | Hertwig et al. |
| 2002/0114187 | A1 | 8/2002 | Choi et al. |
| 2003/0172261 | A1 | 9/2003 | Lee et al. |
| 2004/0230738 | A1 | 11/2004 | Lim et al. |
| 2007/0028082 | A1 | 2/2007 | Lien |
| 2010/0037041 | A1 * | 2/2010 | Joshi et al. .................. 713/2 |

OTHER PUBLICATIONS

Notification of Transmittal of the International Search Report and the Written Opinion issued in International Application No. PCT/US2007/075789, mailed Feb. 6, 2008, pp. 1-12. Notification Concerning Transmittal of International Preliminary Report on Patentability issued in International Application No. PCT/US2007/075789, mailed Mar. 26, 2009, pp. 1-9.

* cited by examiner

Primary Examiner — Jae Yu
(74) Attorney, Agent, or Firm — Fish & Richardson P.C.

(57) ABSTRACT

Systems and techniques for accessing a memory, such as a NAND or NOR flash memory, involve storing an operating application for a computing device in a first memory and storing a driver containing software operable to control the first memory in a second memory that is independently accessible from the first memory. By storing the driver in a second memory that is independently accessible from the first memory, changes to the driver and/or the first memory can be made without altering the operating application.

20 Claims, 3 Drawing Sheets

US 8,131,917 B2

STORING A DRIVER FOR CONTROLLING A MEMORY

CLAIM OF PRIORITY

This application is a continuation application of and claims priority under 35 USC §120 to U.S. patent application Ser. No. 11/531,197, filed on Sep. 12, 2006, the entire contents of which are hereby incorporated by reference.

TECHNICAL FIELD

This description relates to storing a driver for controlling a memory.

BACKGROUND

Typically, when a processing device is turned on, a boot sequence is initiated to load an operating system, firmware image, and/or a software application from a high-capacity memory such as a NAND flash into the device's main memory, such as a random access memory (RAM). Integrated into the operating system, firmware image, and/or software application is typically a driver that is used to control and monitor the functionality of the high-capacity memory. The driver portion is typically specific to a particular type, brand, or release of high-capacity memory because each type, brand, or release of the memory requires its own unique set of instructions and/or has certain control or monitoring requirements. In addition to loading the memory driver, the boot sequence also loads the software application, firmware image, and/or operating system that is used to control operations performed by the device.

Commercially available processing devices are generally produced in large quantities, often using the same operating system, firmware image, and/or software application over time. For example, the same firmware image may be included in iPod™ handheld devices, available from Apple Computer of Cupertino, Calif., or other similar devices between releases of updated versions of the underlying operating system or application software for the device. Thus, the firmware image may remain unchanged for many months—even a year or more—at a time. There is therefore little if any need for a manufacturer to update the portion of the operating system, firmware image, and/or software application that is used to load the operating system.

Hardware components for the devices can be selected by the manufacturer based on factors that may change over time, such as differences in cost, ability to fill orders, and/or quality between components from a variety of manufacturers. When the manufacturing specifications of a component, such as the high capacity memory, is changed or updated, it typically is necessary to update the corresponding driver for the memory. This change in the driver necessitates a reconfiguration of the entire software application, firmware image, and/or operating system so that the updated driver is integrated into the reconfigured software application, firmware image, and/or operating system.

SUMMARY

It can be inefficient to continually access and modify an entire software application, firmware image, or operating system when only a small portion requires an update. Techniques and systems can be implemented to enable updates to a driver application without the need to alter other portions of the operating system, firmware image, and/or software application.

In one general aspect, an operating application for a computing device is stored in a first memory. A driver containing software operable to control the first memory is stored in a second memory that is independently accessible from the first memory.

Implementations may include one or more of the following features. The first memory is a NAND flash memory, and the second memory is a NOR flash memory. The driver is loaded from the NOR flash memory in response to a start up of the computing device. The driver is executed to load the operating application. The driver is executed from the second memory. The driver is loaded into a third memory and executed from the third memory. The third memory is a random access memory. The driver can also be executed from the second memory using execution in place techniques. The driver is executed for accessing user data stored on the first memory.

In another general aspect, a driver stored in a first nonvolatile memory is accessed and loaded into a second memory. The driver is then executed to access an application stored in a third nonvolatile memory that is independently accessible from the first nonvolatile memory.

Implementations may include one or more of the following features. The first memory is a NOR flash and the second memory comprises a random access memory. The third memory is a NAND flash.

In yet another general aspect, a first set of computing devices having a first nonvolatile memory and a second nonvolatile memory that is independently accessible from the first nonvolatile memory are produced. The computing devices are produced using a first supply of the first nonvolatile memories. An operating application is stored in the first nonvolatile memory of each of the computing devices in the first set. A first driver, containing software for accessing the first nonvolatile memory, is stored in the second nonvolatile memory of each of the computing devices in the first set. A second set of computing devices having a first nonvolatile memory and a second nonvolatile memory that is independently accessible from the first nonvolatile memory is produced. The computing devices are produced using a second supply of the first nonvolatile memories that use a different driver from the first nonvolatile memories in the first supply. The operating application is stored in the first nonvolatile memory of each of the computing devices in the second set. A second driver, containing software for accessing the first nonvolatile memory, is stored in the second nonvolatile memory of each of the computing devices in the second set.

Implementations may include one or more of the following features. The first nonvolatile memory is a NAND flash and the second nonvolatile memory is a NOR flash or a serially connected flash. The first driver and the second driver are each operable to control access to the operating application and user data stored on the first nonvolatile memory for the respective first and second supplies of the first nonvolatile memories.

In yet another aspect, a first flash memory stores an operating application, and a second flash memory stores a driver operable to control access to the first flash memory. A host processor is operable to execute the driver stored in the first flash memory to control access to the first flash memory.

Implementations may include one or more of the following features. The host processor is operable to load the driver from the first flash memory into a random access memory. The host processor is operable to execute the driver stored in the first flash memory using execution in place. The host processor is operable to use the driver to load the operating application into a random access memory connected to the host processor and to execute the operating application to control operations of the system. The second flash memory comprises a NOR flash memory.

Described implementations enable the driver for a high capacity memory to be updated without impacting the application, firmware, or operating system of the device. The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
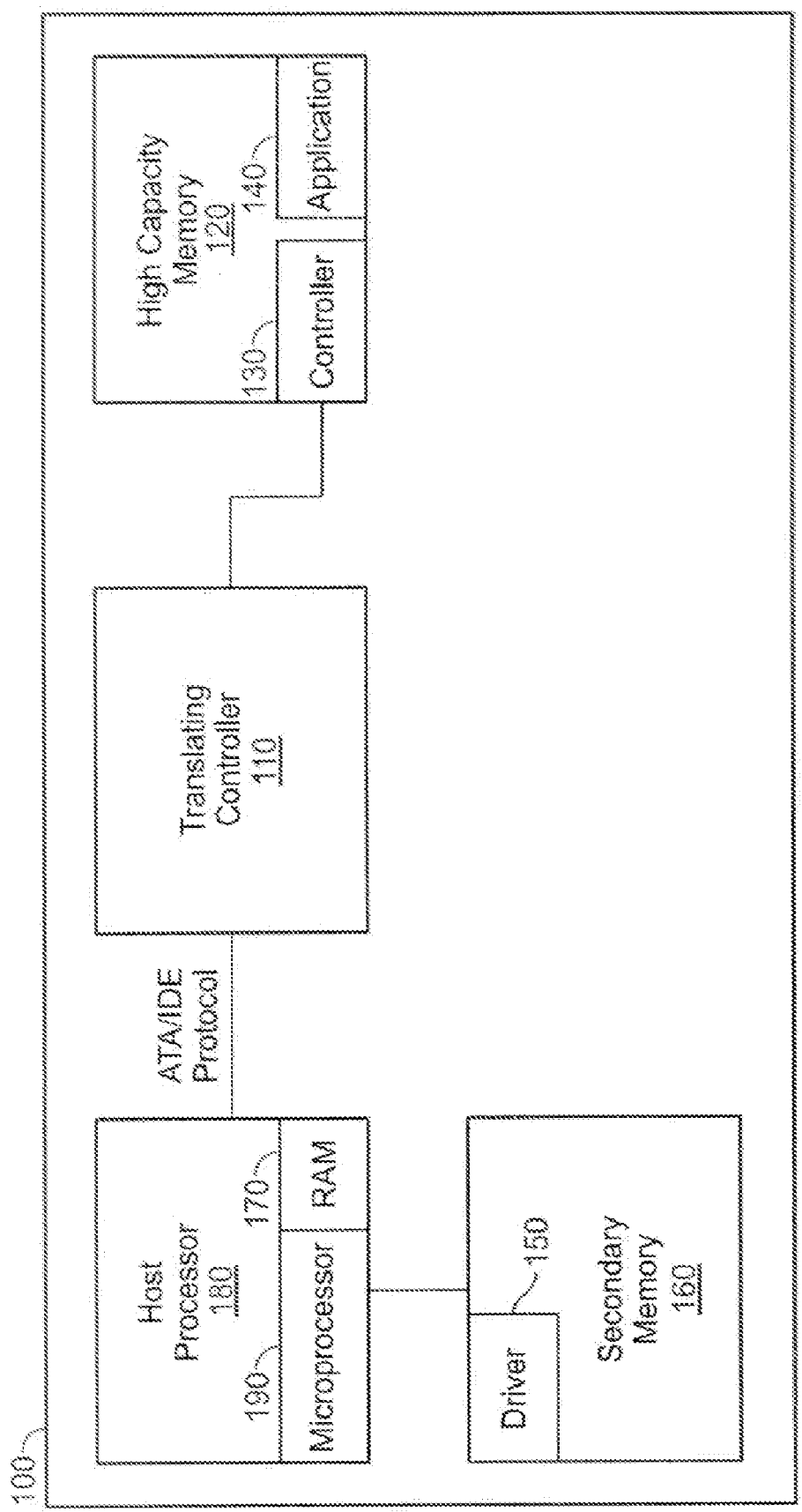
FIG. 1 is a block diagram showing a system that stores a driver used to control a memory separately from a firmware image.

FIG. 1 shows a computer system 100 that is capable of storing a driver 150 to control a high capacity memory 120. The computer system 100 can be a portable device, such as a portable music device (e.g. a portable MPEG-1 Audio Layer 3 (MP3) player), such as an iPod™ available from Apple Computer of Cupertino, Calif., a personal digital assistant, a cell phone, a handheld computer, a removable memory device (e.g., an Universal Serial Bus (USB) flash drive), or other embedded systems, for example. The driver can include a set of instructions that can be used to communicate with and control the high capacity memory 120, including for controlling access to software and/or user data stored on the memory 120. This set of instructions can be specific to the manufacturer, model, or version of the high capacity memory 120. In a conventional system, the driver 150 is integrated into an operating system, firmware image, or software application that is used to control the general operation of the system 100 (i.e., the operating application), which may be stored on the high capacity memory 120 itself. In addition, the high capacity memory 120 may be used to store user data (e.g., digital music) and/or additional software that can be used to perform more specialized functions on the device 100.

In the illustrated system, the device 100 contains a high capacity memory 120 that can store data and the software for the application 140 that runs the device 100. In some implementations, the high capacity memory 120 is a NAND flash drive. The high capacity memory 120 can also be a hard drive or another type of high capacity memory as known to those in the art. The application 140 stored on the high capacity memory 120 contains software, such as an operating system or MP3 playback application, that can be loaded and executed on the device 100. The high capacity memory 120 also typically stores program instructions and/or other data (e.g., user data, such as MP3 files) using some type of file system (e.g., in a Hierarchical File System (HFS), a File Allocation Table (FAT) file system, a New Technology File System (NTFS), a second extended file system ext2, an ISO 9660 file system, an Universal Disk Format (UDF), etc.).

The high capacity memory 120 includes an internal controller 130 that typically includes minimal logic for facilitating access to the memory 120. For example, the internal controller 130 may operate to receive data access commands, such as read commands or write commands, from external processors (e.g., a microprocessor 190) to enable access to data stored on the memory 120. In some implementations, the internal controller 130 receives commands through a translating controller 110. For example, the microprocessor 190 may send read and write commands using a protocol designed for hard drive communications, and the translating controller 110 translates the commands (and performs any necessary caching) into a proprietary or standardized protocol used by the memory 120.

Instead of storing the driver 150 in the high capacity memory 120, the driver 150 for the high capacity memory 120 is stored so that it is separately accessible from the application 140. As shown in FIG. 1, the driver 150 (and associated data in some implementations) is stored on a secondary memory chip 160. This chip 160 could be a NOR flash, a NAND flash, a serially connected flash, a RAM chip, a hard drive, or other type of memory. As a result, changes over time in the specific high capacity memory 120 hardware (and the corresponding changes in the driver 150) used in manufacturing the devices 100 can be conveniently made without having to reconfigure the firmware image that is stored during manufacture on the memory 120 of the device 100. Thus, the same firmware image can be stored on the various different high capacity memory 120 hardware that are used in manufacturing devices 100. Each different type, brand, or version of the hardware can have a corresponding driver 150 that is stored on a separate flash memory. In many cases, this capability can simplify the manufacturing process by avoiding the need to reconfigure the firmware image each time different memory hardware is used. Instead, the only change needed is to program a separate memory 160 with a different driver 150 that corresponds to the specific memory hardware being used.

The driver 150 for the high capacity memory 120 is thus stored in a separate memory from the device application 140. This separate memory is separately accessible from the application 140. In some implementations, the separate memory need not be physically separate from the memory device 120 used for storing the application 140. Storing the driver 150 in a separately accessible location allows any updates to the driver 150 that result from the use of different memory hardware in the manufacturing process to be made without a need to access or change the application 140.

As shown in FIG. 1, in some implementations, the computer system 100 includes a host processor 180. The host processor 180 is the main processor for the device 100. Most of the operations of the device 100 are performed by the host processor 180. The host processor 180 includes a microprocessor 190 and a random access memory (RAM) 170, such as a dynamic RAM or static RAM. The microprocessor 190 is capable of retrieving and executing software instructions stored in the high capacity memory 120. Typically, the microprocessor 190 is programmed with a boot loader that initiates a more extensive boot sequence for the device 100. The boot sequence generally prepares the device upon start up or reset for performing normal operations. Among other things, the boot sequence may load the driver 150 into the RAM 170 of the host processor 180. Thus, the boot code includes instructions for retrieving the driver 150 from the secondary memory 160 or other storage location and separately retrieving device software or operating system from the high capacity memory 120.

The microprocessor 190 can transmit instructions to and retrieve data from the high capacity memory 120. For example, the host processor 180 can transmit a write command and a memory address destination for writing data to the high capacity memory 120. In addition, host processor 180 can transmit a read command and a page address to the high capacity memory 120 to retrieve a particular memory page in the high capacity memory 120.

In some implementations, the host processor 180 communicates with a memory controller 130 internal to the high capacity memory 120 directly. In such cases, the host processor 180 is programmed to use a communication protocol appropriate for the particular type of high capacity memory 120. In other implementations, the host processor 180 communicates with the memory controller 130 via a translating controller 110. For example, the host processor 180 can communicate with the translating controller 110 using ATA/IDE protocol or other protocols as known in the art. The translating controller 110 can translate received commands and convey messages to the memory controller 130 using flash or other protocols. The memory controller 130 carries out READ/WRITE operations on to the high capacity memory 120 in accordance with the received messages. The translating controller 110 can be a separate device or it can be integrated into the high capacity memory 120. The translating controller 110 can be of the type manufactured by SST of Sunnyvale, Calif., or any similar manufacturers in the field.

Figure 2:
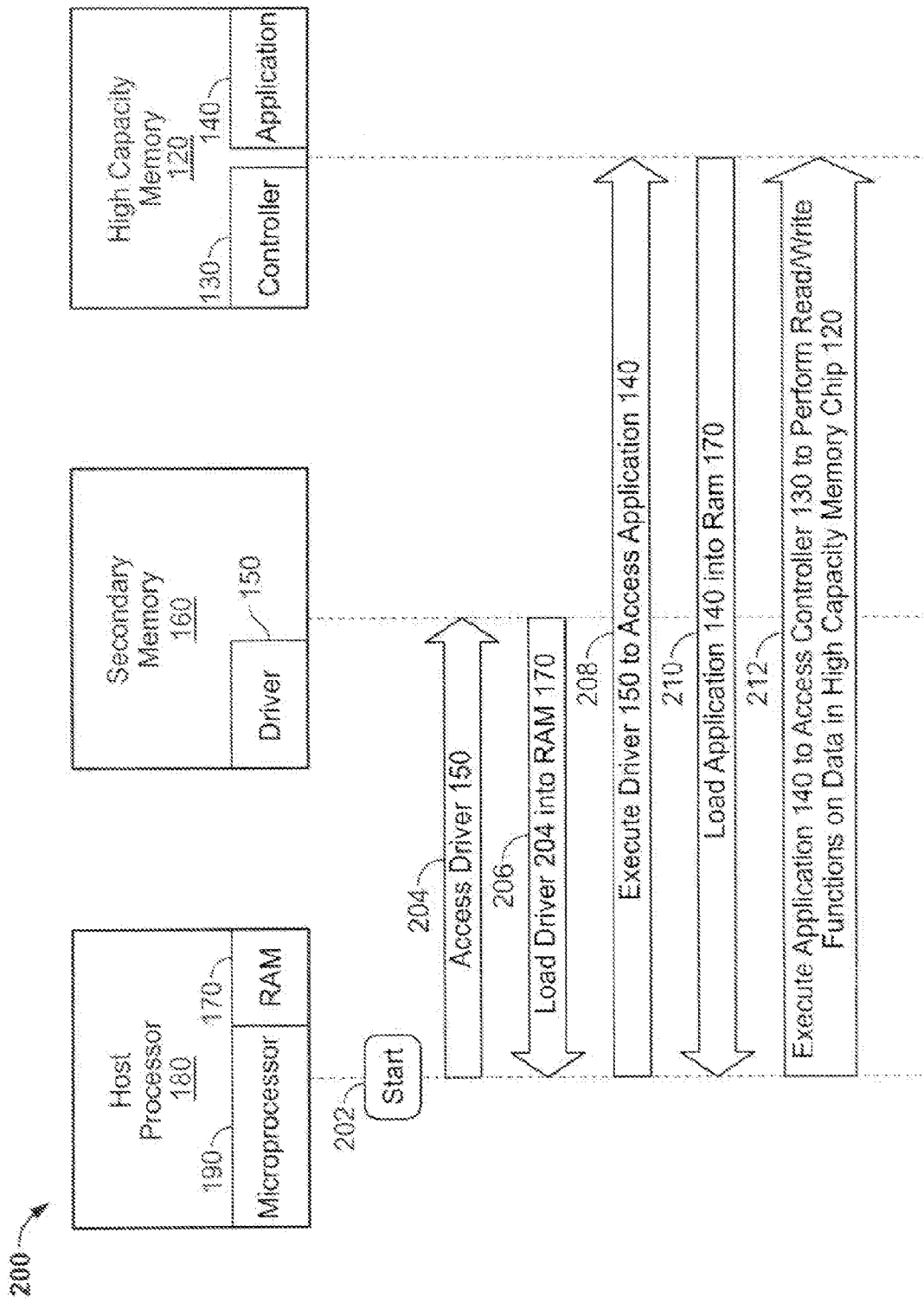
FIG. 2 is a flow diagram illustrating a method for storing a driver to control a memory.

As shown in FIG. 2, upon device reset or start-up (at 202) the host processor 180 accesses the driver 150 and associated data stored in the secondary memory 150 (at 204). In some implementations, the host processor 180 loads the driver 150 and the associated data into its RAM 170 (at 206). In some implementations, the host processor 180 executes the driver 150 directly from the secondary memory 150 without loading the driver 150 into a RAM 170 or other memory device (i.e., using execution in place). For example, execution in place can be used for the driver 150 in a NOR flash memory or using the techniques described in co-pending application Ser. No. 11/400,854, filed Apr. 10, 2006, entitled "Direct Boot Arrangement Using a NAND Flash Memory," which is incorporated here by reference.

The host processor 180 executes the driver 150 to access the application 140 stored on the high capacity memory 120 (at 208). In some implementations, the host processor 180 loads the application 140 into its RAM 170 (at 210). In some implementations the host processor 180 executes the application directly from the high capacity memory 120 (i.e., using execution in place), for example, using the same or similar techniques described above.

The host processor 180 executes the application 140 to load an operating system or run an MP3 playback application including READ/WRITE commands to the high capacity memory 120 (at 212).

Figure 3:
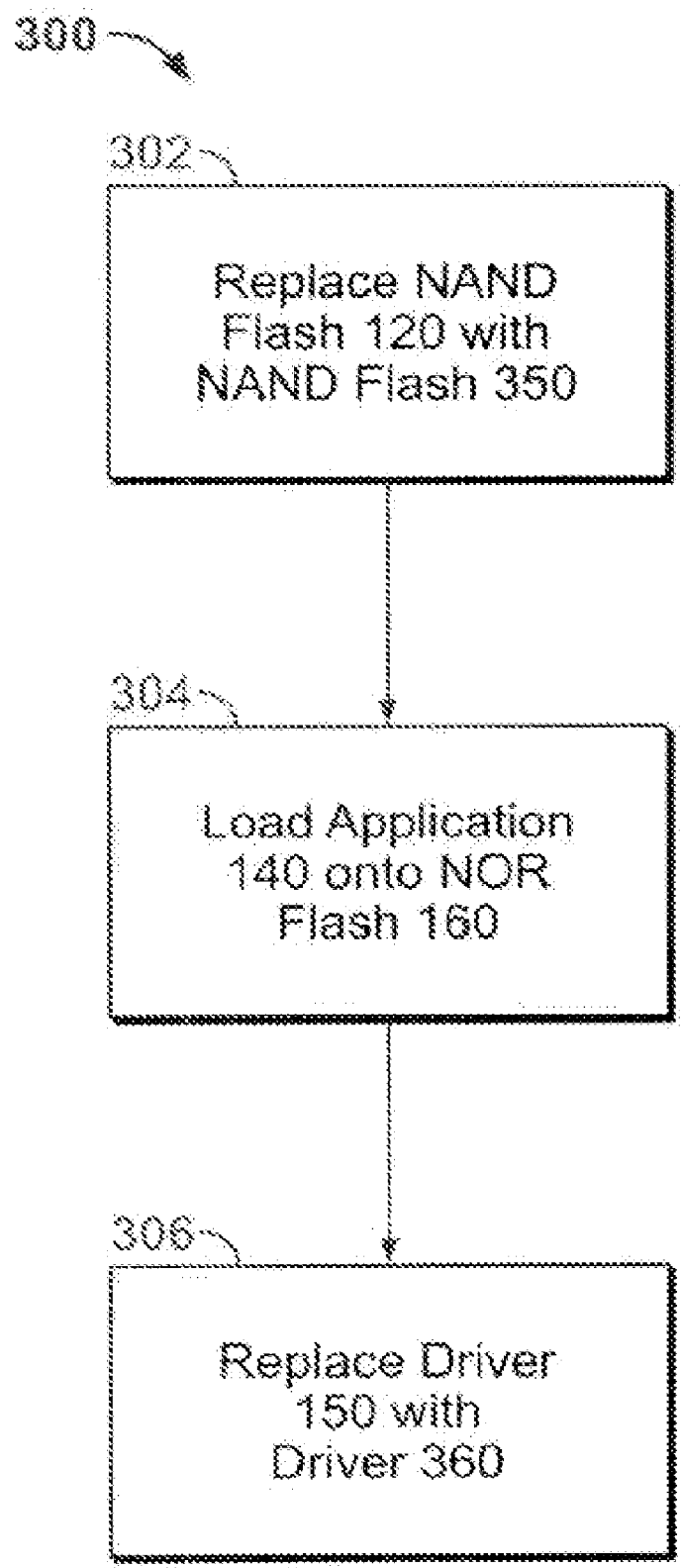
FIG. 3 is a flow diagram illustrating a method for updating a driver.

FIG. 3 illustrates a process 300 for updating driver 150. During manufacturing, it is often common to update the hardware that constitutes the high capacity memory 120 with regular frequency based on changes in the supply of such hardware (e.g., changes in memory vendors). In some cases, it is also possible that a high capacity memory 120 may be replaced in a device 100 after manufacture and distribution (e.g., to replace a defective memory). In either case, such a change typically necessitates updating the corresponding driver 150 that enables the host processor 180 to communicate with the high capacity memory 120. However, the same device application 140 for the device 100 can be used in such a situation. It is therefore advantageous to be able to access and store the driver 150 independently from the application 140.

In some implementations, a NAND flash 120 is replaced with a new NAND flash 350 made by a different manufacturer (at 302). Although it is possible that such a replacement may occur in a particular device, more commonly this replacement occurs in a manufacturing process. Thus, a large number of devices may be manufactured using a particular type of NAND flash 120, but at some point the supply of flash memories for the device may change, such that NAND flash 120 is replaced in the manufacturing process by the new NAND flash 350. Application 140 is loaded onto the NAND flash 350 in its original format (at 304). In other words, the same application 140 used during the manufacture of devices with the new NAND flash 350 as in the manufacture of devices with the earlier NAND flash 120. A new driver 360 is separately loaded onto the NOR flash 160 in place of original driver 150 (at 306). The hardware used for the NOR flash 160 can be the same type for both the NAND flash 120 and the NAND flash 350 or can be different types. However, the NOR flash 160 is loaded with a corresponding original driver 150 when used with the NAND flash 120 and is loaded with a new driver corresponding to the new NAND flash 350 when used with the new NAND flash 350. Although this implementation is described in the context of NAND flash memories and NOR flash memories, other types of memories can also be used as described above.

The described techniques of using a secondary memory for storing a driver corresponding to the type of primary memory can be particularly useful in portable and/or handheld devices in which it is desirable to minimize the size of the device and the number and size of components therein. Similarly, the described techniques are also particularly useful in devices where the operating application is stored in the same memory component as is allocated for user data, although the techniques can be used in systems where different memory components are allocated for storing the operating application and for storing user data. Although the use of a secondary memory for storing the driver necessitates adding a component as compared to a device in which the driver is stored on the same memory as the operating application, the driver can typically be stored on a small memory component, and the benefits of segregating the driver from the operating application can offset the addition of the secondary memory component.

The invention and most of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. Portions of the processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. In some implementations, the described processes and techniques may be limited to use in connection with NAND flash memories or other nonvolatile memories in which individual memory locations are not separately addressable. The processor and the memory can be supplemented by, or incorporated in, special purpose logic circuitry.

To provide for interaction with a user, the invention can be implemented on a computer or device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of implementations have been described. Nevertheless, it will be understood that various modifications may be made. For example, in some cases, operations can be performed in a different order than that described and shown in the Figures. In addition, the techniques can be used in connection with nonvolatile memories other than NAND flash memories, such as other memories in which data typically cannot be randomly accessed and/or retrieved on a byte-by-byte basis. Moreover, loading of a predetermined page of data from the flash memory blocks into the register can be performed in response to one or more predetermined conditions other than the receipt of a reset signal. Accordingly, other implementations are within the scope of the following claims.

What is claimed is:

1. A method comprising:
    storing an operating application for a computing device in a first memory; and
    storing a driver for the first memory in a second memory that is independently accessible relative to the first memory, wherein the driver includes software operable to control access to the first memory subsequent to execution of a boot sequence for the computing device, wherein a capacity of the second memory is less than a capacity of the first memory.

2. The method of claim 1 wherein the first memory comprises a NAND flash memory.

3. The method of claim 1 wherein the second memory comprises a NOR flash memory.

4. The method of claim 3 further comprising loading the driver from the NOR flash memory in response to a start up of the computing device.

5. The method of claim 1 further comprising executing the driver to load the operating application.

6. The method of claim 5 wherein the driver is executed from the second memory.

7. The method of claim 1 further comprising:
    loading the driver into a third memory; and
    executing the driver from the third memory.

8. The method of claim 7 wherein the third memory is a random access memory.

9. The method of claim 1 further comprising executing the driver from the second memory using execution in place techniques.

10. The method of claim 1 further comprising executing the driver for accessing user data stored on the first memory.

11. An article comprising a machine-readable medium storing instructions for causing data processing apparatus to perform operations comprising:
    accessing a driver stored in a first memory, the driver containing software operable to control access to user data subsequent to execution of a boot sequence for the data processing apparatus, the user data stored in a second memory that is independently accessible relative to the first memory; and
    executing the driver directly from the first memory.

12. The article of claim 11, wherein executing the driver allows a processor to access an application stored in the second memory.

13. The article of claim 12, wherein accessing the application includes loading the application into a random access memory.

14. The article of claim 12, wherein accessing the application includes executing the application directly from the second memory.

15. The article of claim 12, wherein the operations further comprise at least one of loading an operating system or executing an MP3 playback application in response to access of the application.

16. The article of claim 11, wherein the first memory comprises a NOR flash.

17. The article of claim 11, wherein the second memory comprises a NAND flash.

18. A system comprising:
    a first flash memory storing an operating application; a second flash memory, independently accessible relative to the first flash memory, storing a driver operable to control access to user data stored on the first flash memory subsequent to executing a boot sequence that includes loading the operating application from the first flash memory; a host processor operable to execute the driver stored in the second flash memory to load the operating application from the first flash memory.

19. The system of claim 18 wherein the host processor is operable to load the driver from the second flash memory into a random access memory prior to executing the driver.

20. The system of claim 18 wherein the host processor is operable to execute the driver directly from the second flash memory using execution in place.

* * * * *